(12) United States Patent
Fukada

(10) Patent No.: US 7,155,390 B2
(45) Date of Patent: Dec. 26, 2006

(54) SPEECH INFORMATION PROCESSING METHOD AND APPARATUS AND STORAGE MEDIUM USING A SEGMENT PITCH PATTERN MODEL

(75) Inventor: Toshiaki Fukada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 10/965,854

(22) Filed: Oct. 18, 2004

(65) Prior Publication Data
US 2005/0055207 A1 Mar. 10, 2005

Related U.S. Application Data

(62) Division of application No. 09/818,599, filed on Mar. 28, 2001, now Pat. No. 6,826,531.

(30) Foreign Application Priority Data
Mar. 31, 2000 (JP) .............................. 2000-099534

(51) Int. Cl.
*G10L 15/02* (2006.01)
(52) U.S. Cl. ..................................... 704/254
(58) Field of Classification Search ..................... None
See application file for complete search history.

(56) References Cited

U.S. PATENT DOCUMENTS

| 4,489,433 | A | * | 12/1984 | Suehiro et al. ............. 704/221 |
| 5,276,766 | A | | 1/1994 | Bahl et al. |
| 5,333,236 | A | | 7/1994 | Bahl et al. |
| 5,633,984 | A | | 5/1997 | Aso et al. |
| 5,715,368 | A | | 2/1998 | Saito et al. |
| 5,745,650 | A | | 4/1998 | Otsuka et al. |
| 5,745,651 | A | | 4/1998 | Otsuka et al. |
| 5,845,047 | A | | 12/1998 | Fukada et al. |
| 5,907,826 | A | * | 5/1999 | Takagi ........................ 704/251 |
| 6,226,614 | B1 | | 5/2001 | Mizuno et al. |
| 6,333,794 | B1 | | 12/2001 | Imai et al. |
| 6,334,106 | B1 | | 12/2001 | Mizuno et al. |
| 6,529,874 | B1 | | 3/2003 | Kagoshima et al. |
| 6,546,367 | B1 | | 4/2003 | Otsuka |
| 6,778,960 | B1 | | 8/2004 | Fukada |
| 6,826,531 | B1 | * | 11/2004 | Fukada ........................ 704/258 |

FOREIGN PATENT DOCUMENTS

| JP | 59-3497 | 1/1984 |
| JP | 5-19780 | 1/1993 |

(Continued)

OTHER PUBLICATIONS

"Pitch Pattern Generation Using HMMs Based on Multi-space Probability Distribution," Collection of Papers Presented at the 1998 Spring Meeting of the Acoustic Society of Japan, The Acoustic Society of Japan, 1-7-18, pp. 215-216, Mar. 17, 1998, and English translation thereof.

*Primary Examiner*—Susan McFadden
(74) *Attorney, Agent, or Firm*—Fitzpatrick, Cella, Harper & Scinto

(57) ABSTRACT

A speech information processing apparatus and method performs speech recognition. Speech is input, and feature parameters of the input speech are extracted. The feature parameters are recognized based on a segment pitch pattern model. The segment pitch pattern model may be obtained by modeling time change in a fundamental frequency of a phoneme belonging to a predetermined phonemic environment with a polynomial segment model. The segment pitch pattern model may also be obtained by modeling with at least one of a single mixed distribution and a multiple mixed distribution.

6 Claims, 12 Drawing Sheets

FOREIGN PATENT DOCUMENTS

| | | |
|---|---|---|
| JP | 5-80791 | 4/1993 |
| JP | 5-204392 | 8/1993 |
| JP | 6-175696 | 6/1994 |
| JP | 6-236197 | 8/1994 |
| JP | 9-258766 | 10/1997 |
| JP | 10-149189 | 6/1998 |
| JP | 10-254471 | 9/1998 |
| JP | 11-95783 | 4/1999 |
| JP | 11-504734 | 4/1999 |
| JP | 2000-47680 | 2/2000 |
| WO | WO 97/32299 | 9/1997 |

\* cited by examiner

FIG. 4

| SPEECH FILE NUMBER | START TIME (msec) | END TIME (msec) | PHONEME | UNVOICED(0)/ VOICED(1) |
|---|---|---|---|---|
| 1 | 0 | 250 | pau | 0 |
| 1 | 250 | 400 | o | 1 |
| 1 | 400 | 500 | N | 1 |
| 1 | 500 | 550 | s | 0 |
| 1 | 550 | 700 | e | 1 |
| 1 | 700 | 800 | e | 1 |
| 1 | 800 | 1000 | pau | 0 |

FIG. 6

| SPEECH FILE NUMBER | START TIME (msec) | END TIME (msec) | PHONEME | MORA POSITION | ACCENT TYPE |
|---|---|---|---|---|---|
| 1 | 0 | 250 | pau | −1 | −1 |
| 1 | 250 | 400 | o | 1 | 1 |
| 1 | 400 | 500 | N | 2 | 1 |
| 1 | 500 | 550 | s | 3 | 1 |
| 1 | 550 | 700 | e | 3 | 1 |
| 1 | 700 | 800 | e | 4 | 1 |
| 1 | 800 | 1000 | pau | −1 | −1 |

FIG. 9

| SPEECH FILE NUMBER | START TIME (msec) | END TIME (msec) | PHONEME | MORA POSITION | ACCENT TYPE |
|---|---|---|---|---|---|
| 2 | 0 | 100 | pau | −1 | −1 |
| 2 | 100 | 200 | a | 1 | 1 |
| 2 | 200 | 250 | K | 2 | 1 |
| 2 | 250 | 350 | u | 2 | 1 |
| 2 | 350 | 450 | s | 3 | 1 |
| 2 | 450 | 550 | e | 3 | 1 |
| 2 | 550 | 700 | N | 4 | 1 |
| 2 | 700 | 800 | t | 5 | 1 |
| 2 | 800 | 900 | o | 5 | 1 |
| 2 | 900 | 1000 | pau | −1 | −1 |

SPEECH INFORMATION PROCESSING METHOD AND APPARATUS AND STORAGE MEDIUM USING A SEGMENT PITCH PATTERN MODEL

This Application is a Div of Ser. No. 09/818,599 Mar. 28, 2001 U.S. Pat. No. 6,826,531.

FIELD OF THE INVENTION

The present invention relates to a speech information processing method and apparatus for setting a time series fundamental frequency (pitch pattern) in predetermined segment units upon speech synthesis or speech recognition, and a computer-readable storage medium holding a program for execution of the speech processing method.

BACKGROUND OF THE INVENTION

Recently, a speech synthesis apparatus has been developed so as to convert an arbitrary character string into a phonological series and convert the phonological series into synthesized speech in accordance with predetermined speech synthesis by rule.

However, the synthesized speech outputted from the conventional speech synthesis apparatus sounds unnatural and mechanical in comparison with natural speech sounded by a human being. For example, in a phonological series "o, X, s, e, i" of a character series "onsei", the accuracy of prosody generation rules for generating accent and intonation of each phoneme is considered as one of the factors of the awkward-sounding result. If the accuracy is low, as a sufficient pitch pattern cannot be generated for the phonological series, the synthesized speech becomes unnatural and mechanical.

SUMMARY OF THE INVENTION

The present invention has been made in consideration of the above prior art, and has as its object to provide a speech information processing method and apparatus for speech synthesis to produce natural intonation by modeling time change in fundamental frequency of a predetermined unit of phoneme.

To attain the foregoing objects, the present invention provides a speech information processing method comprising: an input step of inputting a predetermined unit of phonological series; a generation step of generating fundamental frequencies of respective phonemes constructing the phonological series based on a segment pitch pattern model; and a speech synthesis step of synthesizing speech based on the fundamental frequencies of the respective phonemes generated at the generation step.

Further, the present invention provides a speech information processing apparatus comprising: input means for inputting a predetermined unit of phonological series; generation means for generating fundamental frequencies of respective phonemes constructing the phonological series based on a segment pitch pattern model; and speech synthesis means for synthesizing speech based on the fundamental frequencies of the respective phonemes generated by the generation means.

Further, another object of the present invention is to provide speech information processing method and apparatus for high-accuracy speech recognition using model information obtained by modeling time change in fundamental frequency of phoneme of a predetermined unit.

Further, to attain the foregoing object, the present invention provides a speech information processing method comprising: an input step of inputting speech; an extraction step of extracting a feature parameter of the speech; and a speech recognition step of recognizing the feature parameter based on a segment pitch pattern model.

Further, the present invention provides a speech information processing apparatus comprising: input means for inputting speech; extraction means for extracting a feature parameter of the speech; and speech recognition means for recognizing the feature parameter based on a segment pitch pattern model.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of side information related to phonological series "oNsee" stored in a side information file according to the embodiment;

FIG. 6 is a table showing an example of side information related to phonological series "oNsee" stored in a label file according to the embodiment;

FIG. 9 is a table showing an example of information related to phonological series "akuseNto"stored in the label file according to the embodiment;

DETAILED DESCRIPTION OF THE PREFERRED EMBODIMENTS

Figure 1:
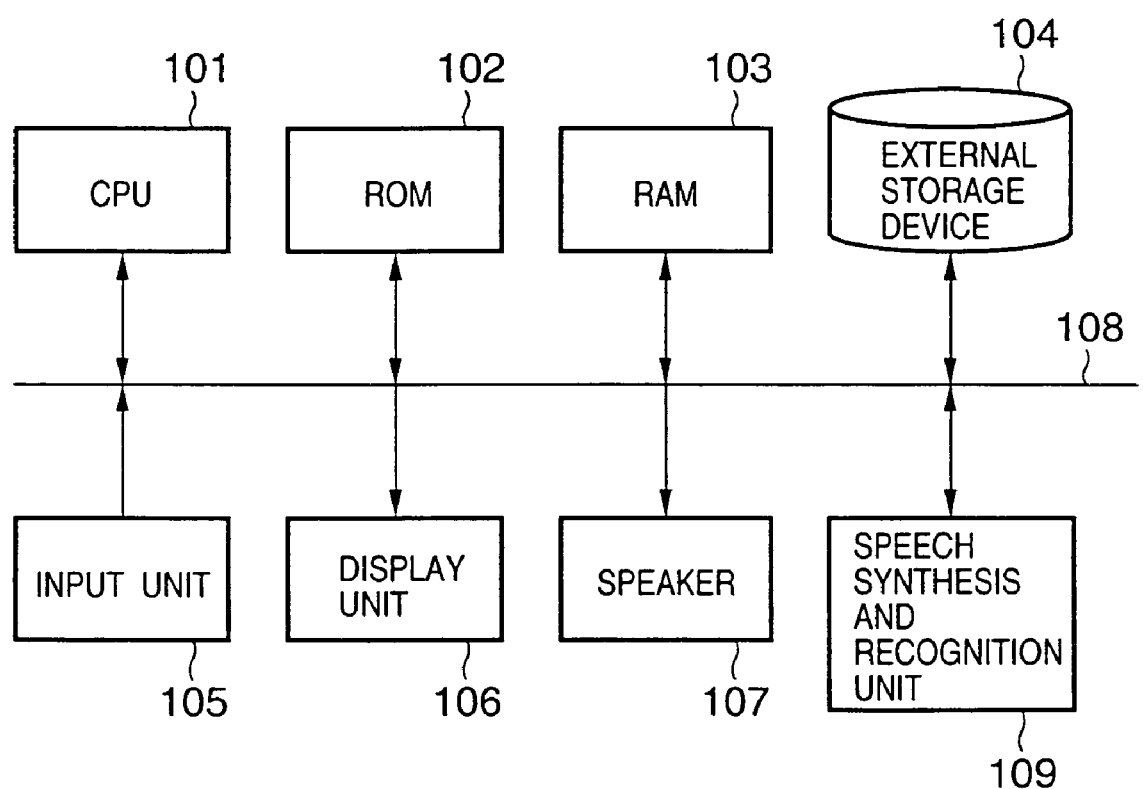
FIG. 1 is a block diagram showing the hardware construction of a speech synthesizing apparatus (speech recognition apparatus) according to an embodiment of the present invention.

The outline of polynomial segment model according to embodiments of the present invention is as follows. An L-frame length D-dimensional observation vector $\{y1, \ldots, yL\}$ yt=[yt,1,yt,2, \ldots, yt,D] is represented as L×D matrix:

$$Y = \begin{bmatrix} y_{1,1} & y_{1,2} & \cdots & y_{1,D} \\ y_{2,1} & y_{2,2} & \cdots & y_{2,D} \\ \vdots & \vdots & \vdots & \vdots \\ y_{L,1} & y_{L,2} & \cdots & y_{L,D} \end{bmatrix} \quad (1)$$

The matrix is represented by an R-order polynomial segment model as:

$$Y = ZB + E \quad (2)$$

Z is a design matrix of L×(R+1) and represented as:

$$Z = \begin{bmatrix} 1 & 0 & \cdots & 0 \\ 1 & \frac{1}{L-1} & \cdots & \left(\frac{1}{L-1}\right)^R \\ \vdots & \vdots & & \vdots \\ 1 & \frac{t-1}{L-1} & \cdots & \left(\frac{t-1}{L-1}\right)^R \\ \vdots & \vdots & & \vdots \\ 1 & 1 & \cdots & 1 \end{bmatrix} \quad (3)$$

Further, B is a parameter series matrix of (R+1)×D:

$$B = \begin{bmatrix} b_{0,1} & b_{0,2} & \cdots & b_{0,D} \\ b_{1,1} & b_{1,2} & \cdots & b_{1,D} \\ \vdots & \vdots & & \vdots \\ b_{R,1} & b_{R,2} & \cdots & b_{R,D} \end{bmatrix} \quad (4)$$

E is a predicted error matrix of L×D:

$$E = \begin{bmatrix} e_{1,1} & e_{1,2} & \cdots & e_{1,D} \\ e_{2,1} & e_{2,2} & \cdots & e_{2,D} \\ \vdots & \vdots & & \vdots \\ e_{L,1} & e_{L,2} & \cdots & e_{L,D} \end{bmatrix} \quad (5)$$

A segment having a length which varies in correspondence with the design matrix Z is normalized from "0" to "1".

Likelihood upon generation of the segment Y by a label a is represented as:

$$P(Y | a) = \prod_{i=1}^{L} f(yt) \quad (6)$$

In the above expression (6), f(yt) is likelihood of feature vector yt for the label a obtained by:

$$f(y_t) = \frac{1}{(2\pi)^{\frac{D}{2}} |\Sigma_a|^{\frac{1}{2}}} \exp\left\{-\frac{1}{2}(y_t - z_t B_a)^T \Sigma_a^{-1}(y_t - z_1 B_a)\right\} \quad (7)$$

Note that Ba and Za are parameters of single Gaussian segment model representing the label a. In the above expression, zt is given as:

$$z_t = \left[1, \frac{t-1}{L-1}, \cdots, \left(\frac{t-1}{L-1}\right)^R\right] \quad (8)$$

In a case where K segments Y1, Y2, ... YK exist for the label a, and model parameters Ba and Σa are obtained, the probability of these segments for the parameters Ba and Σa is obtained as:

$$P(Y_1, Y_2, \cdots, Y_K | B_a, \Sigma_a) = \prod_{k=1}^{K} P(Y_k | B_a, \Sigma_a) \quad (9)$$

$$= \prod_{k=1}^{K} \prod_{l=1}^{L} f(y_{k,l})$$

The model parameters are obtained by obtaining the parameters Ba and Σa to maximize the above probability. These estimated values are obtained as:

$$\overline{B}_a = \left[\sum_{k=1}^{K} Z_k^T Z_k\right]^{-1} \left[\sum_{k=1}^{K} Z_k^T Y_k\right] \quad (10)$$

$$\Sigma_a = \frac{\sum_{k=1}^{K} (Y_k - Z_k \overline{B}_a)^T (Y_k - Z_k \overline{B}_a)}{\sum_{k=1}^{K} L_k} \quad (11)$$

In this manner, the time series correlation of segment pitch pattern can be considered by performing multiple modeling on time change in segment pitch pattern; thus, the problem in the above conventional art can be solved.

Next, preferred embodiments of the present invention will now be described in detail in accordance with the accompanying drawings.

First Embodiment

FIG. 1 is a block diagram showing the construction of a speech synthesizing apparatus according to a first embodiment of the present invention.

In FIG. 1, reference numeral 101 denotes a CPU which performs various controls in the speech synthesizing apparatus of the present embodiment in accordance with a control program stored in a ROM 102 or a control program loaded from an external storage device 104 onto a RAM 103. The control program executed by the CPU 101, various parameters and the like are stored in the ROM 102. The RAM 103 provides a work area for the CPU 101 upon execution of the various controls. Further, the control program executed by the CPU 101 is stored in the RAM 103. The external storage device 104 is a hard disk, a floppy disk, a CD-ROM or the like. If the storage device is a hard disk, various programs installed from CD-ROMs, floppy disks and the like are stored in the storage device. Numeral 105 denotes an input unit having a keyboard and a pointing device such as a mouse. Further, the input unit 105 may input data from the Internet via, e.g., a communication line. Numeral 106 denotes a display unit such as a liquid crystal display or a CRT, which displays various data under the control of the CPU 101. Numeral 107 denotes a speaker which converts a speech signal (electric signal) into speech as an audio sound and outputs the speech. Numeral 108 denotes a bus connecting the above units. Numeral 109 denotes a speech synthesis and recognition unit.

Figure 2:
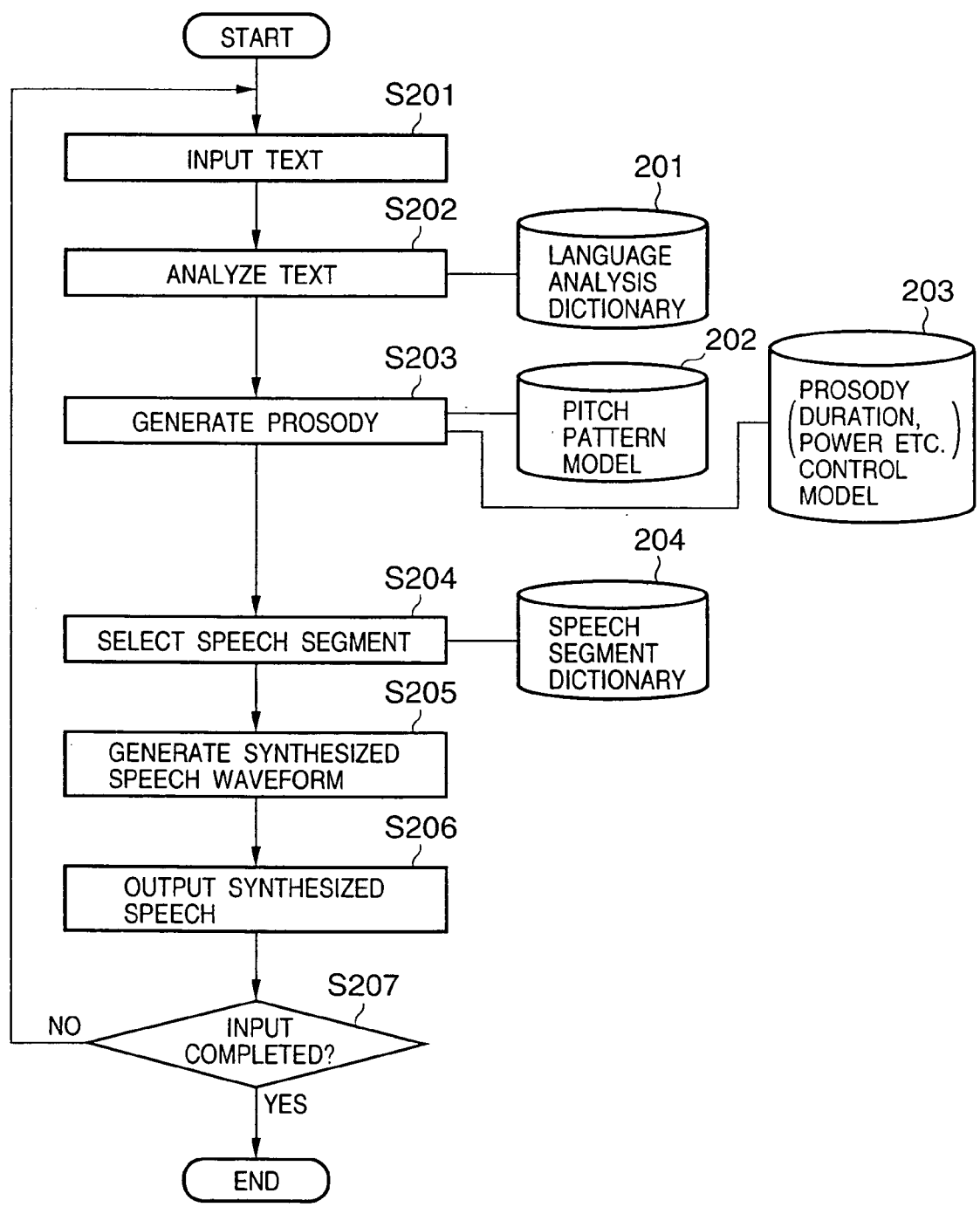
FIG. 2 is a flowchart showing a processing procedure of speech synthesis in the speech synthesizing apparatus according to the embodiment.

FIG. 2 is a flowchart showing the operation of the speech synthesis and recognition unit 109 according to the first embodiment. The following respective steps are performed by execution of the control program stored in the ROM 102 or the control program loaded from the external storage device 104 by the CPU 101.

At step S201, Japanese text data of Kanji and Kana letters, or text data in another language, is inputted from the input unit 105. At step S202, the input text data is analyzed by using a language analysis dictionary 201, and information on a phonological series (reading), accent and the like of the input text data is extracted. Next, at step S203, prosody (prosodic information) such as duration, fundamental frequency (segment pitch pattern), power and the like of each of phonemes forming the phonological series obtained at step S202 is generated. At this time, the segment pitch pattern is determined by using a pitch pattern model 202, and the duration, the power and the like are determined by using a prosody control model 203.

Next, at step S204, plural speech segments (waveforms or feature parameters) to form synthesized speech corresponding to the phonological series are selected from a speech segment dictionary 204, based on the phonological series extracted through analysis at step S202 and the prosody generated at step S203. Next, at step S205, a synthesized speech signal is generated by using the selected speech segments, and at step S206, speech is outputted from the speaker 107 based on the generated synthesized speech signal. Finally, at step S207, it is determined whether or not processing on the input text data has been completed. If the processing is not completed, the process returns to step S201 to continue the above processing.

Figure 3:
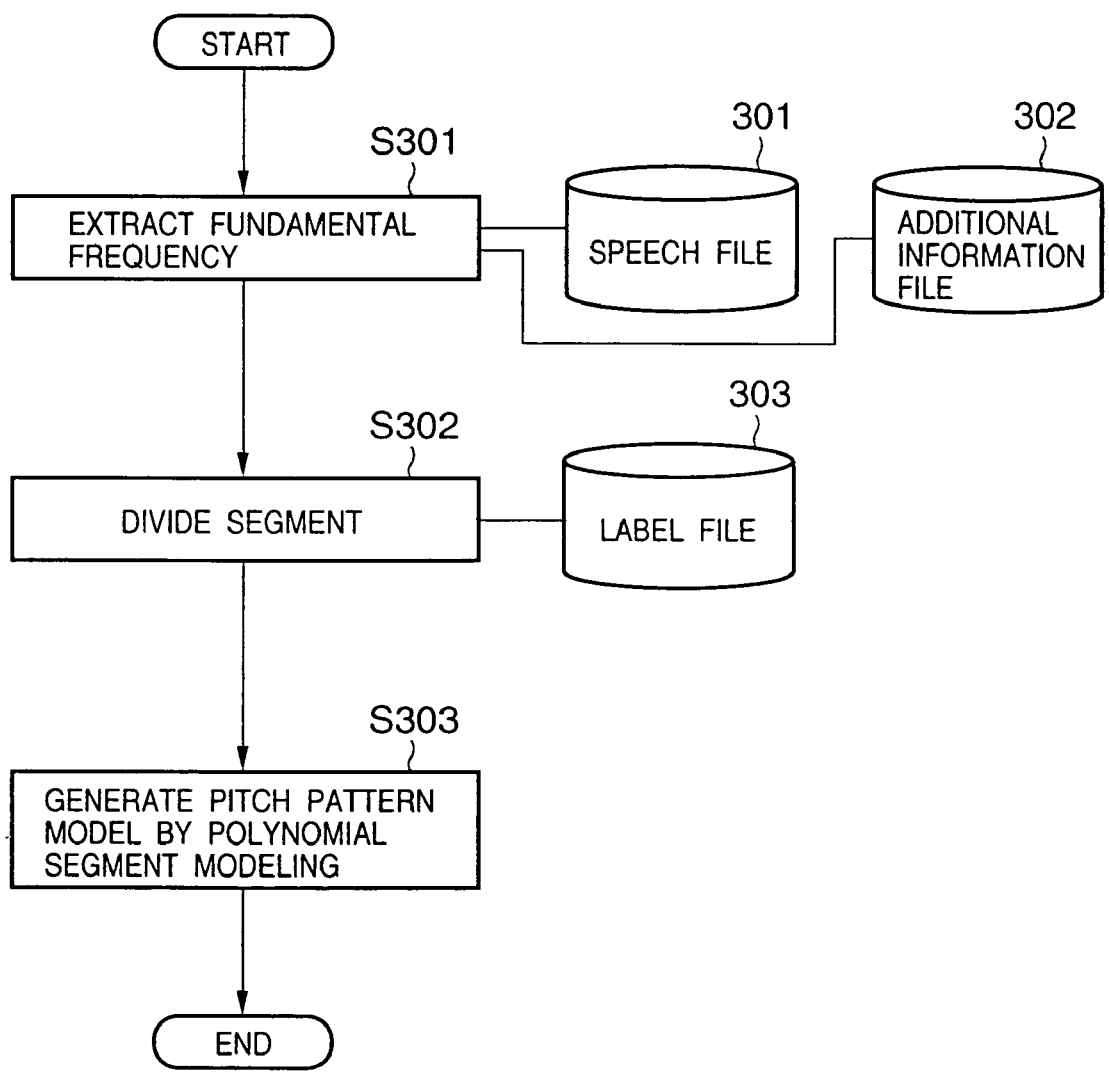
FIG. 3 is a flowchart showing a procedure of generating a segment pitch pattern model based on a polynomial segment model at step S203 in FIG. 2.

FIG. 3 is a flowchart showing a procedure of generating the segment pitch pattern model based on the polynomial segment model used in the prosody generation at step S203 in FIG. 2.

To generate the segment pitch pattern model, first, at step S301, a fundamental frequency (pitch pattern) of a predetermined unit of phonological series is extracted by using a speech file 301 having plural learned samples. Upon extraction of fundamental frequency, if information on the result of voiced/unvoiced determination, a pitch mark and the like is used, an additional information file 302 holding information necessary for fundamental frequency extraction is also used.

Next, the process proceeds to step S302, at which the pitch pattern of the phonological series is divided in segment units by using a label file 303 holding phonemic time information in units of phoneme, syllable, word and the like forming a predetermined unit of phonological series. Finally, the process proceeds to step S303 at which a model parameter of segment pitch pattern model is calculated by using the above expressions (10) and (11) by each segment belonging to the same category.

Hereinbelow, the processing procedure according to the first embodiment will be described with reference to FIGS. 3 to 9.

Figure 5:
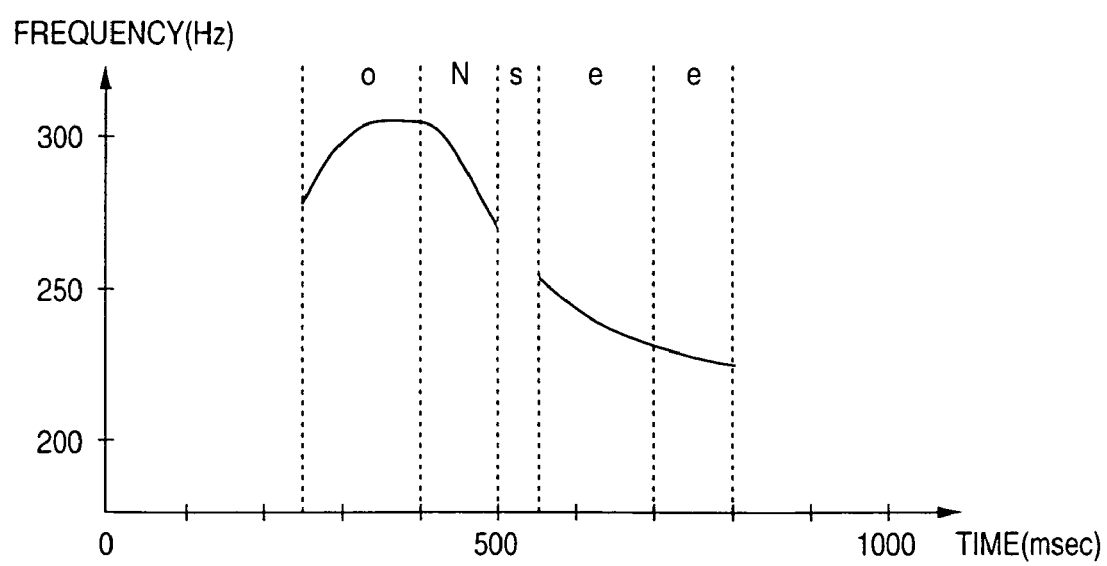
FIG. 5 is a line graph showing an example of a pitch pattern for production of phonological series "Onsei" according to the embodiment.
Figure 7:
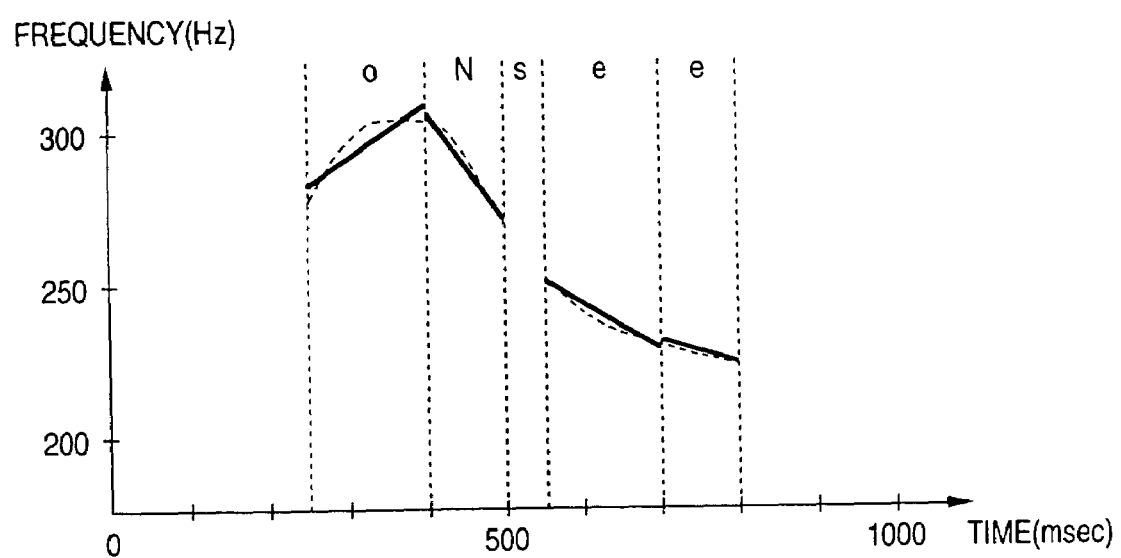
FIG. 7 is a line graph showing an example of a pitch pattern obtained by modeling the pitch pattern in FIG. 5 with a segment model of regression order 1 by phonemic segment in FIG. 6.
Figure 8:
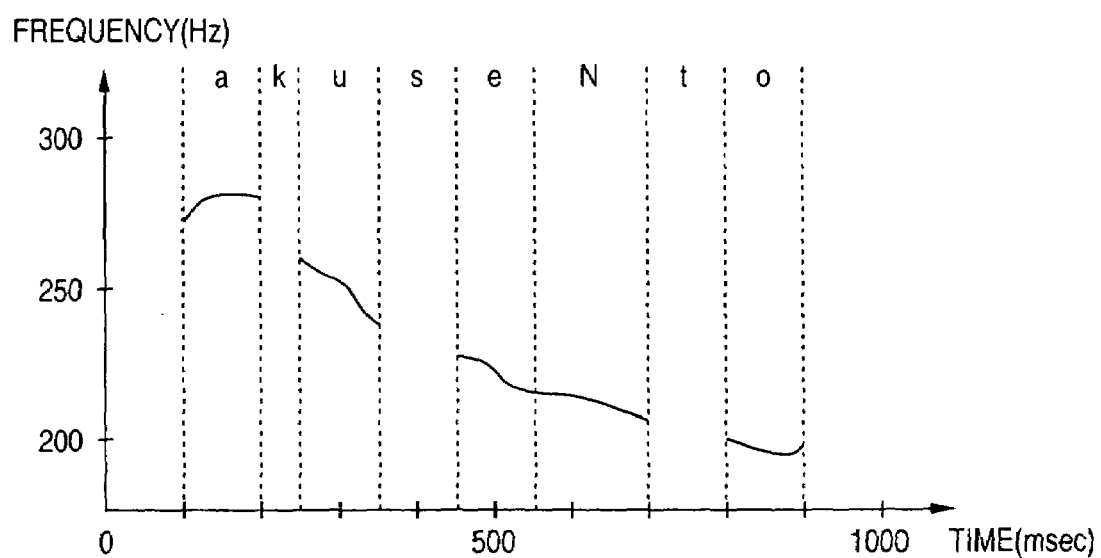
FIG. 8 is a line graph showing an example of a pitch pattern for sounding out a word "Akusento" according to the embodiment.

FIG. 4 is a table showing an example of additional information related to a phonological series "oNsee" stored in the additional information file 302. FIG. 5 is a line graph showing an example of fundamental frequencies for voice intervals (o,N,e,e) in FIG. 4. FIG. 6 is a table showing an example of information related to the phonological series "oNsee" stored in the label file 303. FIG. 7 is a line graph showing an example of a model obtained from the pitch pattern in FIG. 5. FIG. 8 is a line graph showing an example of pitch pattern for a phonological series "akuseNto". FIG. 9 is a table showing an example of information related to the phonological series "akuseNto" stored in the label file 303.

FIG. 4 shows the side information file 302 of the phonological series "oNsee". In FIG. 4, start time, end time, and a flag indicative of voiced/unvoiced of each phoneme (o,N,s,e,e) are set. Note that "pau" means a pause. At this time, in the fundamental frequency extraction processing at step S301, the voiced intervals "o,N,e,e" in FIG. 4 are detected, and their fundamental frequencies are extracted as shown in FIG. 5. Next, when the label file 303 is provided as shown in FIG. 6, the phoneme interval of voiced sounds is divided into segments (respective phonemes in this case) based on the start time and end time information. Next, at step S303, the respective segment pitch patterns of the pitch patterns in FIG. 5 are modeled by an R-order (R=1: linear) segment model as shown in FIG. 7.

Further, the pitch pattern of phonological series "akuseNto" is extracted as shown in FIG. 8. The label file 303 provided at this time is as shown in FIG. 9. The synthesis and recognition unit 109 detects segments belonging to the same phonemic/linguistic environment by using the two pitch patterns as shown in FIGS. 5 and 8, and generates one segment pitch pattern model by modeling the detected segments. In a case where mora position and accent type are selected as the phonemic/linguistic environment, the first mora "o" of "oNsee" (FIG. 6) and the first mora "a" of "akuseNto" have the same accent type "1". Accordingly, these moras are modeled as one segment pitch pattern (the same processing is performed on the second to fourth moras).

The model parameter of the segment pitch pattern obtained by modeling as above is held in the pitch pattern model 202, thereby in the prosody generation processing at step S203, a segment pitch pattern $Y_{pj}$ of each phoneme is generated as $$Y_{pj} = Z_{dpj} B_{pj} \qquad (12)$$

based on the phonemic/linguistic environment for phonological series (p={p1, . . . ,pj}) and the duration (d={dp1, . . . ,dpj}) of each phoneme obtained from the duration model 203. $Z_{dpj}$ is a design matrix of dpj frame, Bpj, a model parameter of segment pitch pattern model corresponding to the phonemic/linguistic environment of phoneme pj.

As described above, according to the first embodiment, each segment pitch pattern is modeled based on the polynomial segment model in consideration of time series correlation of segment pitch pattern, and a pitch pattern of each phoneme forming a predetermined unit of phonological series by using this model. Thus speech with natural intonation can be synthesized and outputted.

Second Embodiment

In the first embodiment, speech synthesis is made by using the segment pitch pattern model obtained by modeling. Next, an example of speech recognition by using the segment pitch pattern model will be described as a second embodiment. The hardware construction of the second embodiment is the same as that in FIG. 1. Note that the input unit 105 is a microphone.

Figure 10:
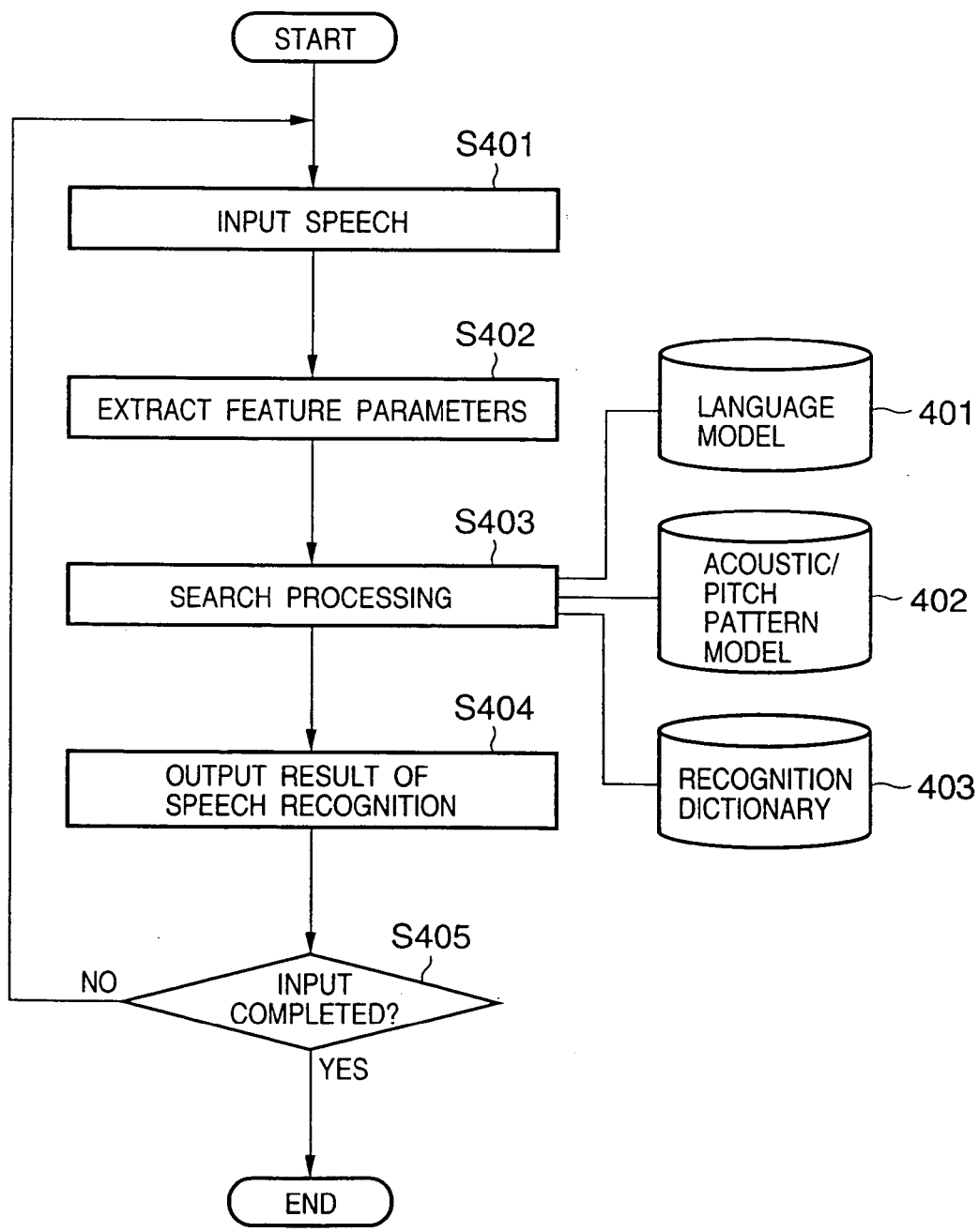
FIG. 10 is a flowchart showing a processing procedure of speech recognition in the speech recognition apparatus according to a second embodiment of the present invention.

FIG. 10 is a flowchart showing the operation of the speech synthesis and recognition unit 109 according to the second embodiment of the present invention. The following respective steps are performed by execution of the control program stored in the ROM 102 or the control program loaded from the external storage device 104 onto the RAM 103 by the CPU 101.

First, at step S401, a speech waveform is inputted from the input unit 105 comprising a microphone or the like. At step S402, feature parameters of the input speech waveform are extracted. In addition to time series Oa(t) of frequency feature amount such as widely-used cepstrum, the time series Op(t) as a feature amount related to pitch such as fundamental frequency and its regression parameter is extracted.

Next, at step S403, searching processing is performed so as to output the result of speech recognition, with the maximum likelihood of the feature parameters obtained at step S402, by using a language model 401 (unnecessary in the case of word recognition), an acoustic/pitch pattern model 402 holding the above-described segment pitch pattern model and a recognition dictionary 403. Next, at step S404, the result of speech recognition is outputted by desired means, e.g., for image display on the display unit 106 or speech output from the speaker 107. Finally, at step S405, it is determined whether or not the speech input from the input unit 105 has been completed. If the input has not been completed, the process returns to step S401, to perform the above-described processing.

Assuming that a logarithmic acoustic likelihood of the word hypothesis W for an acoustic feature vector Oa is Pa(Oa|W), a logarithmic pitch likelihood of the word hypothesis W for a pitch feature vector Op is Pp(Op|W), and a logarithmic linguistic likelihood of the word hypothesis W is Pl(W), a recognition result $\overline{W}$ obtained by the search processing at step S403 is represented as:

$$\overline{W} = \mathrm{argmax}\ \{waPa(Oa \mid W) + \qquad (13)$$
$$wpPp(Op \mid W) + wlPl(W)\}(w \in W)$$

wa, wp and wl are weight coefficients respectively of the logarithmic acoustic likelihood, the logarithmic pitch likelihood and the logarithmic linguistic likelihood. The logarithmic acoustic likelihood is obtained by a conventionally widely-used method such as the HMM (Hidden Markov Model). Also, the logarithmic linguistic likelihood is obtained by a conventional method based on word n-gram or the like. Further, the logarithmic pitch likelihood is obtained by the above expression (9).

Third Embodiment

In the first and second embodiments, the segment pitch pattern is generated by single mixture Gaussian distribution.

Next, as a third embodiment, modeling of pitch pattern by multiple mixture Gaussian distribution will be described.

At this time, f(yt) is represented as follows:

$$f(y_t) = \sum_{m=1}^{M} w_m fm(y_t) \qquad (14)$$

and $$f_m(y_t) = \frac{1}{(2\pi)^{\frac{D}{2}} |\Sigma_m|^{\frac{1}{2}}} \exp\left\{-\frac{1}{2}(y_t - z_t B_m)^T \sum_m^{-1} (y_t - z_t B_m)\right\} \qquad (15)$$

Note that in the expression (14), $w_m$ is weight in the m-th mixed distribution satisfying $\Sigma w_m=1$ (m=1 to M). At this time, model parameters $B_m$, $\Sigma_m$ and $w_m$ in the expression (15) are obtained by the clustering or the EM (Expectation-Maximization) algorithms.

Thus, the performance of the speech recognition apparatus according to the second embodiment can be improved by using the pitch pattern model by the multiple mixture Gaussian distribution obtained as above.

Fourth Embodiment

In the above first embodiment, the segment pitch pattern model is generated directly from the absolute value of fundamental frequency, and a pitch pattern is set in speech synthesis by using this model. Generally, a pitch pattern greatly varies in context and in accordance with speaker. Accordingly, it may be arranged such that upon extraction of pitch pattern, the maximum value, minimum value and the like of fundamental frequency are extracted by a desired speech unit (speech itself is a unit to be processed) such as an accent phrase, a word, a phrase (breathing breakpoint) and a sentence, then the pitch pattern is normalized by utilizing these values, and a segment pitch pattern model is generated by using the normalized pitch pattern.

Figure 11:
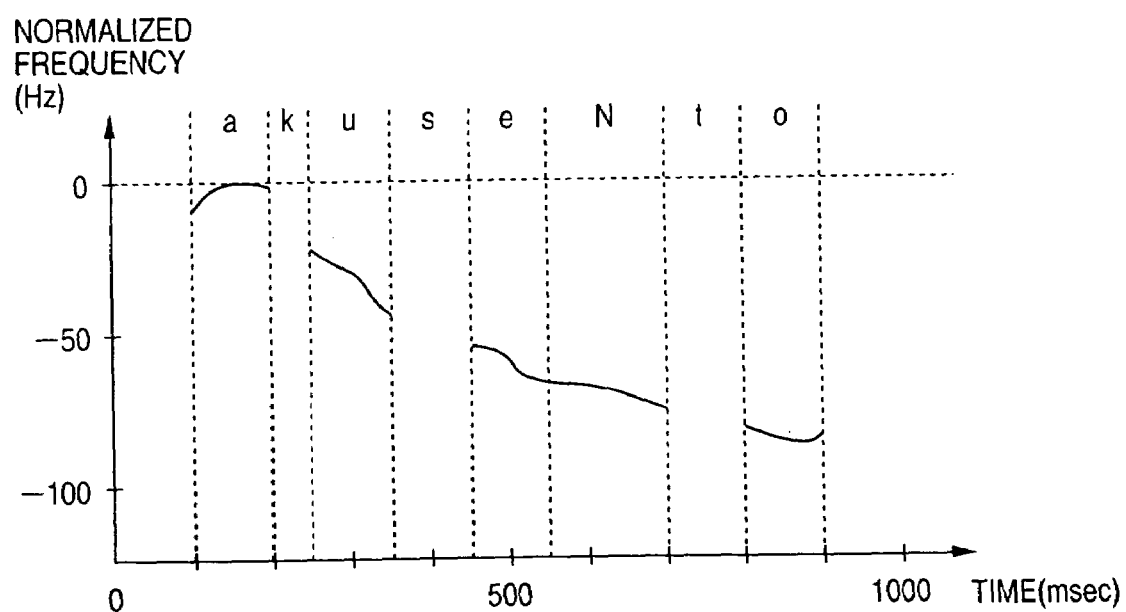
FIG. 11 is a line graph showing an example of a pitch pattern normalized from the pitch pattern in FIG. 8 with the maximum value of fundamental frequency, according to a fourth embodiment of the present invention.

FIG. 11 shows an example of pitch pattern normalized from the pitch pattern in FIG. 8 with the maximum value of fundamental frequency. In this manner, a highly accurate pitch pattern model where the variation due to context and the like is further reduced can be generated by generating a pitch pattern model from a normalized pitch pattern.

Note that when a pitch pattern is generated in the speech synthesis apparatus by using this pitch pattern model, it is necessary to estimate a parameter used in normalization (in FIG. 11, it is the maximum value). The parameter can be obtained by a well-known method using a linear or nonlinear model with phonemic/linguistic context as a factor.

Fifth Embodiment

In the above embodiments, a segment pitch pattern is modeled by a phoneme, which is comparatively short in time; however, the present invention is not limited to this unit. For example, the modeling may be made by a comparatively long unit such as a word or accent. In such case, it is necessary to remove unvoiced interval(s) which lack(s) a fundamental frequency from the modeling of the segment pitch pattern. The modeling of a segment pitch pattern without unvoiced interval can be made by replacing the unvoiced interval with "0" in the above design matrix in the expression (3).

$$Z = \begin{bmatrix} 1 & 0 & \cdots & 0 \\ 1 & \frac{1}{L-1} & \cdots & \left(\frac{1}{L-1}\right)^R \\ \vdots & \vdots & & \vdots \\ 1 & \frac{t_s-1}{L-1} & \cdots & \left(\frac{t_s-1}{L-1}\right)^R \\ 0 & 0 & \cdots & 0 \\ \vdots & \vdots & & \vdots \\ 0 & 0 & \cdots & 0 \\ 1 & \frac{t_e-1}{L-1} & \cdots & \left(\frac{t_e-1}{L-1}\right)^R \\ \vdots & \vdots & & \vdots \\ 1 & 1 & \cdots & 1 \end{bmatrix} \quad (16)$$

Figure 12:
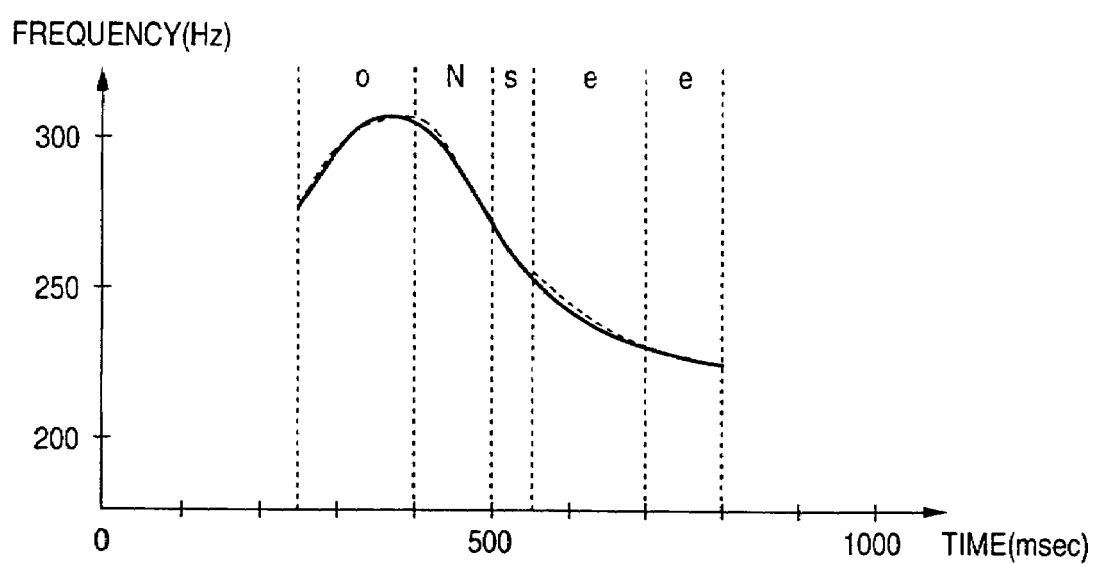
FIG. 12 is a line graph showing an example of a pitch pattern obtained by modeling voiced parts of the pitch pattern in FIG. 5 with a polynomial segment model, according to a fifth embodiment of the present invention.

In this manner, by modeling a one-word pitch pattern in FIG. 5 with the polynomial segment model as a segment pitch pattern, a pitch pattern model including unvoiced intervals as shown in FIG. 12 can be obtained.

Note that the constructions in the above embodiments merely show embodiments of the present invention, and various modification as follows can be made.

In the first embodiment, the segment pitch pattern model is generated in consideration of mora position and accent type as phonemic/linguistic environment; however, another environment such as the number of moras or part of speech may be used. Further, the present invention is applicable to languages other than Japanese.

Further, in the first embodiment, modeling is made by regression of order 1 (R=1); however, the modeling may be made by using an arbitrary integer value greater than 0 (R<L) as R.

In the second embodiment, an example of speech recognition is shown in the speech recognition apparatus using one-path speech recognition method. However, the present invention is applicable to a speech recognition apparatus based on multipath-search speech recognition method. In this method, the result of recognition is re-scored by using a logarithmic pitch likelihood obtained by a segment pitch pattern model, on a candidate of recognition by Nbest or word (phoneme) graph using a conventional speech recognition method.

Further, in the fourth embodiment, a pitch pattern is normalized with the maximum value of fundamental frequency; however, the present invention is not limited to this processing. For example, the normalization may be performed by other normalization such as normalization processing using a minimum value or normalization processing using a dynamic range obtained by the difference between maximum and minimum values.

Further, the object of the present invention can be also achieved by providing a storage medium storing software program code for performing functions of the aforesaid processes according to the above embodiments to a system or an apparatus, reading the program code with a computer (e.g., CPU, MPU) of the system or apparatus from the storage medium, and then executing the program.

In this case, the program code read from the storage medium realizes the functions according to the embodiments, and the storage medium storing the program code constitutes the invention. Further, the storage medium, such as a floppy disk, a hard disk, an optical disk, a magneto-optical disk, a CD-ROM, a CD-R, a DVD, a magnetic tape, a non-volatile type memory card, and a ROM can be used for providing the program code.

Furthermore, besides aforesaid functions according to the above embodiments being realized by executing the program code which is read by a computer, the present invention includes a case where an OS (operating system) or the like working on the computer performs a part of or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part of or entire processes in accordance with designations of the program code and realizes functions of the above embodiments.

As described above, according to the present invention, a pitch pattern of a predetermined unit of phonological series can be modeled with high precision by statistically modeling respective segment pitch patterns in consideration of correlation between segment pitch pattern series. Thus the naturalness of intonation generation in the speech synthesis apparatus or the recognition performance in the speech recognition apparatus which uses fundamental frequencies as feature amounts can be improved.

As described above, according to the present invention, speech synthesis with natural intonation can be made by modeling time change in fundamental frequency of a predetermined unit of phoneme.

Further, according to the present invention, as the time change in fundamental frequency of a predetermined unit of phoneme is modeled, speech recognition can be made with high precision by using the modeled information.

The present invention is not limited to the above embodiments, and various changes and modifications can be made within the spirit and scope of the present invention. Therefore, to apprise the public of the scope of the present invention, the following claims are made.

What is claimed is:

1. A speech information processing method comprising:
an input step of inputting speech;
an extraction step of extracting a feature parameter of the speech; and
a speech recognition step of recognizing the feature parameter based on a segment pitch pattern model,
wherein the segment pitch pattern model is obtained by modeling time change in a fundamental frequency of a phoneme belonging to a predetermined phonemic environment with a polynomial segment model.

2. A speech information processing method comprising:
an input step of inputting speech;
an extraction step of extracting a feature parameter of the speech; and
a speech recognition step of recognizing the feature parameter based on a segment pitch pattern model,
wherein the segment pitch pattern model is obtained by modeling with at least one of a single mixed distribution and a multiple mixed distribution.

3. A computer-readable storage medium holding a program for executing the speech information processing method claimed in claim 1.

4. A speech information processing apparatus comprising:
input means for inputting speech;
extraction means for extracting a feature parameter of the speech; and
speech recognition means for recognizing the feature parameter based on a segment pitch pattern model,
wherein the segment pitch pattern model is obtained by modeling time change in a fundamental frequency of a phoneme belonging to a predetermined phonemic environment with a polynomial segment model.

5. A speech information processing apparatus comprising:
input means for inputting speech;
extraction means for extracting a feature parameter of the speech; and
speech recognition means for recognizing the feature parameter based on a segment pitch pattern model,
wherein the segment pitch pattern model is obtained by modeling with at least one of a single mixed distribution and a multiple mixed distribution.

6. A computer-readable storage medium holding a program for executing the speech information processing method claimed in claim 2.

* * * * *

UNITED STATES PATENT AND TRADEMARK OFFICE
CERTIFICATE OF CORRECTION

PATENT NO. : 7,155,390 B2  
APPLICATION NO. : 10/965854  
DATED : December 26, 2006  
INVENTOR(S) : Fukada Page 1 of 2

It is certified that error appears in the above-identified patent and that said Letters Patent is hereby corrected as shown below:

COLUMN 1:  
Line 6, "09/818,599" should read --09/818,599, filed on--.  
Line 7, "2001" should read --2001, now--.

COLUMN 3:  
Line 7, "{y1,...,yL}yt=[yt,1,yt,2,...,yt,D]" should read --$\{y_1,...,y_L\}\ y_t=[y_{t,1},y_{t,2},...,y_{t,D}]$--.

Expression (6) should read $$-- P(Y|a) = \prod_{i=1}^{L} f(y_t) --$$

COLUMN 4:  
Line 1, "f(yt)" should read --$f(y_t)$--.  
Line 2, "yt" should read --$y_t$--.  
Expression (7) should read $$-- f(y_t) = \frac{1}{(2\pi)^{\frac{D}{2}}|\Sigma_a|^{\frac{1}{2}}} \exp\left\{-\frac{1}{2}(y_t - z_t B_a)^T \Sigma_a^{-1}(y_t - z_t B_a)\right\} --$$

Line 9, "Ba and Za" should read --$B_a$ and $\Sigma_a$--.  
Line 11, "zt" should read --$z_t$--.  
Line 18, "Y1, Y2,...YK" should read --$Y_1, Y_2,...Y_K$--.  
Line 19, "Ba and Σa" should read --$B_a$ and $\Sigma_a$--.  
Line 20, "Ba and Σa" should read --$B_a$ and $\Sigma_a$--.  
Expression (9) should read $$-- P(Y_1, Y_2, \cdots, Y_K | B_a, \Sigma_a) = \prod_{k=1}^{K} P(Y_k | B_a, \Sigma_a) = \prod_{k=1}^{K} \prod_{t=1}^{L_k} f(y_{k,t}) --$$

UNITED STATES PATENT AND TRADEMARK OFFICE
CERTIFICATE OF CORRECTION

PATENT NO.         : 7,155,390 B2                              Page 2 of 2
APPLICATION NO. : 10/965854
DATED              : December 26, 2006
INVENTOR(S)      : Fukada It is certified that error appears in the above-identified patent and that said Letters Patent is hereby corrected as shown below:

Line 32, "Ba and Σa" should read --$B_a$ and $\Sigma_a$--.

COLUMN 8:
Line 3, "f(yt)" should read --$f(y_t)$--.

Signed and Sealed this

First Day of July, 2008

JON W. DUDAS
*Director of the United States Patent and Trademark Office*